United States Patent Office 3,787,552
Patented Jan. 22, 1974

3,787,552
METHOD AND APPARATUS FOR FORMING THINWALLED TUBULAR ARTICLES
Richard R. Spencer, Hot Springs, Ark., and William C. Penny, Alliance, Ohio, assignors to Alliance Rubber Company, Alliance, Ohio
Filed Dec. 21, 1970, Ser. No. 100,038
Int. Cl. B29c 25/00; B29d 23/04; B29h 5/28
U.S. Cl. 264—40                        11 Claims

ABSTRACT OF THE DISCLOSURE

Apparatus for producing thinwalled tubing of elastic material formed by a method including, die forming a mass of the elastic material into thinwalled tubing, supplying a pressurizing fluid and a non-adhesive material through a conduit to the interior of the tubing, and passing the tubing through a curing medium while venting the pressurizing fluid in the tubing through both of its extremities to maintain the tubing uniformly expanded and stabilized in the curing medium.

BACKGROUND OF THE INVENTION

The invention relates generally to a method and apparatus for forming thinwalled tubular articles. More particularly, the invention relates to a method and apparatus for forming and vulcanizing substantially annular or circular thinwalled elastic tubes, particularly of the type suitable for the production of rubber bands, in a continuous process.

Common rubber bands of the type used as fasteners are normally produced by selectively cutting extruded thinwalled tubes of appropriate cross-section. Such tubing is commonly of an oblate or other elongate cross-sectional configuration. However, for certain applications, particularly where rubber bands are applied to products in an assembly line, industry has exhibited a marked preference for bands having a substantially circular or annular cross-section because of the ease with which they can be separated, picked up, applied, and otherwise manipulated.

Applicants' assignor has contributed to the art several methods and apparatus for producing rubber bands of such circular or open configuration. One early method by which such bands may be made is by placing an extruded elastic tube over a circular mandrel of substantially the same or larger diameter and subjecting the mandrel to an open steam vulcanizer of a temperature sufficient to effect vulcanization, whereby the elastic tube substantially retains the configuration of the mandrel. Upon completion of vulcanization, the mandrel is removed from the vulcanizer and the tube removed and cut into narrow bands. One disadvantage of this method is that it has proved difficult to mount the unvulcanized tubing onto the mandrel and to remove the vulcanized tubing from the mandrel, thereby requiring extensive manual labor. The use of a mandrel of a smaller diameter than the tubing is normally objectionable because the sagging of the tubing during vulcanization causes the elastic bands to elongate rather than remain circular. This method furthermore resulted in moisture from the steam condensing on the inner surface of the tubing which had a tendency to produce weak spots. Additionally, points of contact between the mandrel and the tubing would over-cure this portion of the tube, thereby tending to produce localized weakened areas.

Some of the deficiencies of this early method were overcome by the method and apparatus disclosed in U.S. Letters Patent Nos. 2,781,550 and 2,859,474, respectively, granted to applicants' assignor. This method for the production of circular rubber bands employed a reel supporting a plurality of cylindrical mandrels rotatably mounted about a horizontal axis. The mandrels were of substantially smaller diameter than the tubes positioned thereon, thus causing the tubes to rotate on the mandrels when the reel-mandrel assembly was rotated within a vulcanizer. This method, although solving some of the problems of the aforementioned process, was nevertheless deficient in certain respects. The bands were still subject to weak spots due to moisture condensing on the inside of the tubes and due to the tubes adhering to a particular portion of the mandrel. Further, this process, like its predecessor, was inherently a batch type process limited to the practical extent of the mandrels and ill-suited to the demands for a high output, automated and efficient technique.

Although various types of extruders have been used for making tubing, they have been in general directed to thickwalled articles such as hoses. In some situations where thinwall tubing is produced, compressed air has been blown into the tube to maintain the circular shape until the extruded material has cured. In other instances, compressed air has been used to expand the tube and thus facilitate the production of thinwalled tubing. In such devices, plugs have often been incorporated in the tubing to maintain the air pressure; however, such plugs greatly hinder the application of a non-adhesive material to the interior of a tube to prevent the tube from adhering to itself, since the flow of air is substantially reduced. Other devices to achieve the coating of a non-adhesive material on the inside of a tube supply air at high pressures and contemporaneously evacuate air out of the tube through the die, thereby obviating the production of a circular tube since the tube collapses and assumes a permanent set during curing. Thus, no single system known to applicants has produced a satisfactory combination of the requisite features to allow continuous production of uniform, annular thinwalled tubing.

SUMMARY OF THE INVENTION

It is therefore an object of the present invention to provide a method and apparatus for continuously producing substantially annular elastic thinwalled tubing. Another object of the invention is to provide a method and apparatus wherein extruded tubing is uniformly expanded to a selected diameter by an internal pressurizing fluid and subsequently maintained at substantially the selected diameter during curing. A further object is to provide for venting of the internal pressurizing fluid proximate each extremity of the tubing.

Still another object of the invention is to provide for insertion and removal of internal pressurizing fluid in an extruded tubing in such a manner that it may entrain a non-adhesive material for application to the interior of the tubing to prevent any tendency for self-adherence in subsequent temporary deformation. Still a further object of the invention is to provide for controlled venting of internal pressurizing fluid in extruded tubing so that the tubing may be controllably passed through a fluid curing medium. An additional object of the invention is to provide a fast, efficient means of producing thinwalled tubing employing relatively non-complex apparatus, while maintaining the cured tubing within close tolerances.

In general, the invention relates to apparatus and a method of employing the apparatus for continuously producing thinwalled tubing from elastic material by die forming a mass of the elastic material into a thinwalled tubing, applying a pressurized fluid and a non-adhesive material through a conduit to the interior of the tubing to expand and lubricate the tubing, and directing the tubing through a curing medium while venting the pressurizing fluid in the tubing through both its extremities.

DESCRIPTION OF THE DRAWINGS

FIG. 3 is an enlarged fragmentary longitudinal sectional view similar to FIG. 2 showing the details of the transition handling of the tubing between the inspection conveyor and the curing medium unit.

DESCRIPTION OF A PREFERRED EMBODIMENT

Figure 1:
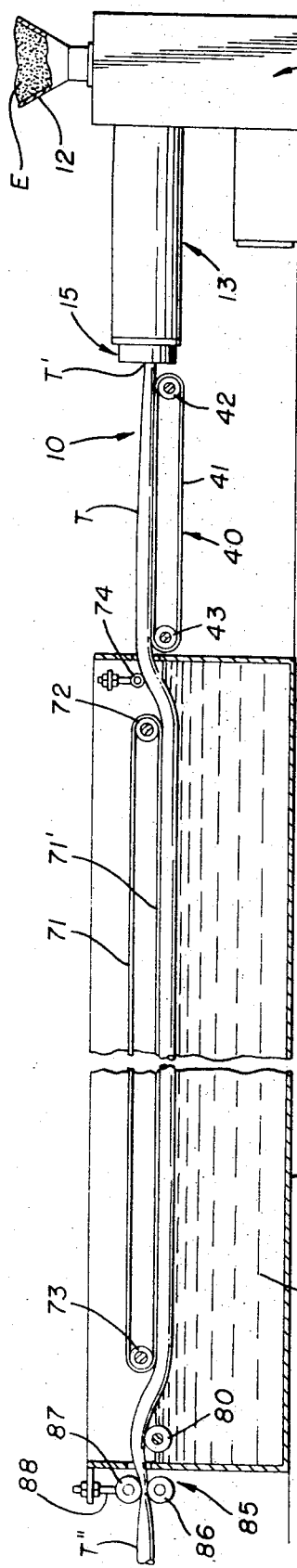
FIG. 1 is a schematic side elevation showing apparatus according to the present invention suitable for practice of the method of the present invention including an extruder, a die forming mechanism, take-away conveyor, and a curing unit.

Referring now to the drawings and particularly to FIG. 1, an exemplary tube forming apparatus for the production of an annular elastic thinwalled tubing according to the method of the present invention is generally indicated by the numeral 10. The tube forming apparatus 10 has an extruder, generally indicated by the numeral 11, which receives previously milled or otherwise processed elastomer E, which may be of natural or synthetic origin, from a feed hopper 12. The structure and operation of the extruder 11 may employ known apparatus and may be according to any of a number of established practices to produce flow of a continuous mass of elastic material M (FIG. 2) of substantially cylindrical configuration. If the resultant tubing is to be used for common rubber bands the elastomer E may preferably be of relatively high rubber content and low durometer.

Figure 2:
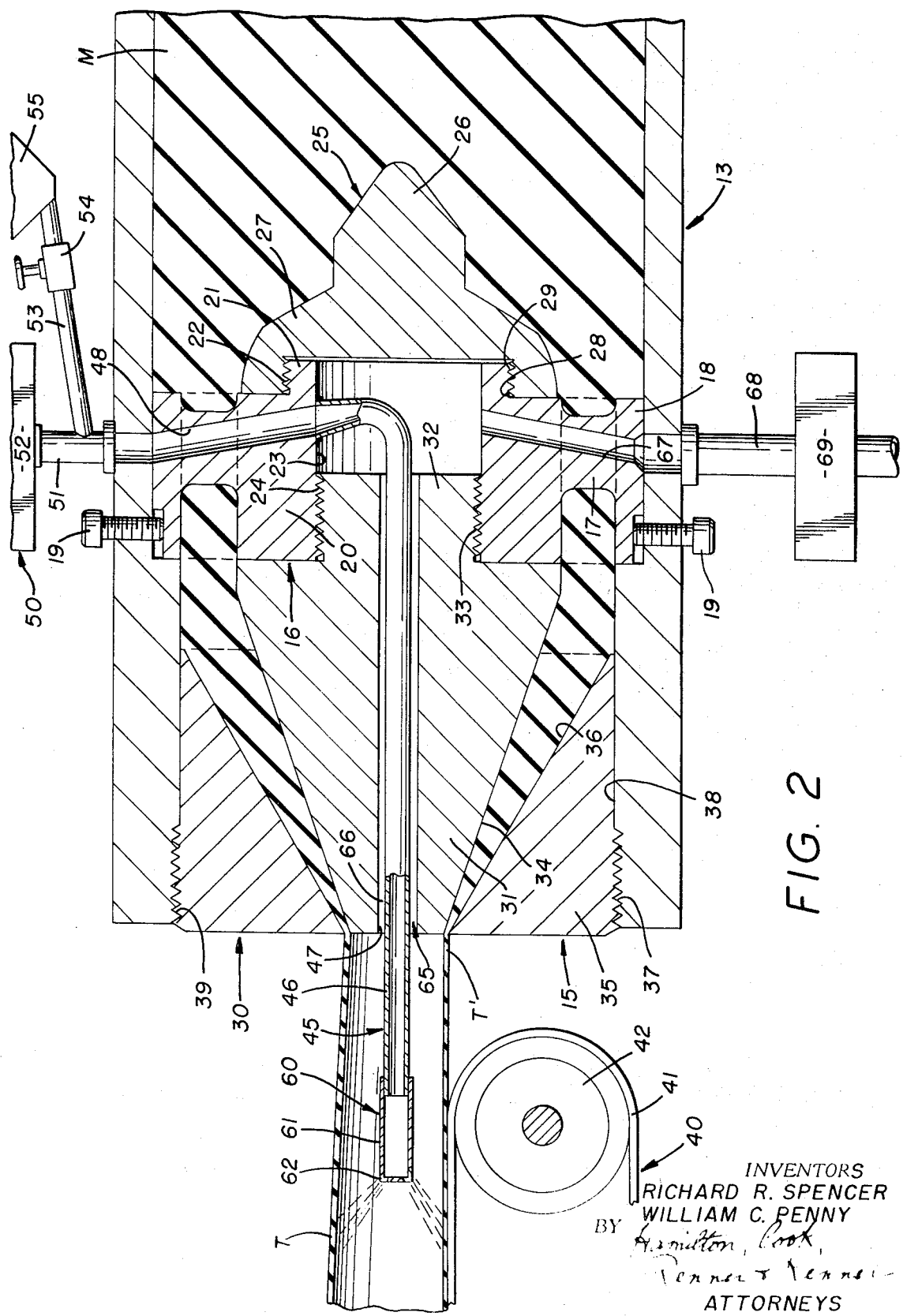
FIG. 2 is an enlarged fragmentary longitudinal sectional view taken substantially through and showing particularly the details of the die forming mechanism of FIG. 1 and its relationship to the take-away conveyor and the extruder.

The continuous flow of elastic material M from extruder 11 is directed and constrained by a tubular housing, generally indicated by the numeral 13. The tubular housing 13 accommodates, at its extremity opposite the extruder 11, a die forming mechanism, generally indicated by the numeral 15, which transforms the mass of elastic material M of substantially cylindrical configuration into a substantially annular stream of tubing T (FIG. 2). The die forming mechanism 15 has a spider, generally indicated by the numeral 16, having spaced radial ribs 17 which terminate in a rim 18 that engages the interior of the tubular housing 13. The spider 16 is longitudinally and rotatably fixed with respect to the tubular housing 13 by machine screws 19 or other suitable fasteners which may extend through housing 13 and engage the rim 18. The spider 16 has a hub portion 20 having a flange 21, which may be provided with threads 22, projecting in one direction and a through bore 23, which may be provided with threads 24 over a portion of its length, all for purposes hereinafter described.

The material M of substantially cylindrical configuration flowing from extruder 11 in tubular housing 13 is diverted around hub portion 20 of spider 16 and between ribs 17 by a spider cap, generally indicated by the numeral 25. As shown, the spider cap 25 has a somewhat conical outward configuration to progressively divert the material M radially outwardly from an apex 26 around a shoulder portion 27. The spider cap 25 at its axial extremity opposite apex 26 is attached to the spider 16 as by a bore 28 having threads 29 adapted to matingly engage the threads 22 on flange 21 of the hub portion 20 of spider 16. When positioned, the spider cap 25 also closes the end of through bore 23 of hub 20 proximate the flange 21.

Subsequent to diversion around spider cap 25 and through the spider 16, the elastic material M is directed into a die assembly, generally indicated by the numeral 30. As shown, the die assembly 30 has a core 31 having a projecting flange 32 suitably externally threaded at 33 to matingly engage the threads 24 in bore 23 of hub 20 for attachment to the spider 16. The core 31 has an outer surface 34 which may be substantially conical to restrict radially inward displacement of the elastic material M. The die assembly 30 has a die cap 35 which cooperates with core 31 to produce the tubing T in a manner to be described. The die cap 35 has an internal conical surface 36 which preferably tapers radially inwardly at a greater rate than surface 34 of core 31, thereby forming a progressively converging annular channel into which the elastic material M is compacted into a uniform mass eliminating any irregularities which may have been introduced in the travel through the area proximate spider cap 25 and spider 16. The wall thickness of the tubing T extruded between surfaces 34 and 36 may be controlled by the position of die cap 35 longitudinally of core 31 which may be adjusted by providing threads 37 on the exterior surface 38 of die cap 35 which matingly engage an extent of threads 39 on the interior of tubular housing 13.

Referring now to FIGS. 1 and 2, the tubing T has a first extremity T' at the point of extrusion from the die forming mechanisms 15 and an extent thereof supported and displaced therefrom by a take-away conveyor, generally indicated by the numeral 40. As shown, the take-away conveyor 40 may be of conventional construction having an endless belt 41 positioned to substantially tangentially engage and frictionally displace the extruded tubing T on a pair of rolls 42 and 43, one of which may be driven by a conventional power source (not shown). The rate of travel of endless belt 41 is preferably substantially the same as or slightly greater than the rate at which extruded tubing T is expelled from the die forming mechanism 15. The disposition of tubing T on the take-away conveyor 40 also serves as a convenient inspection station should it be desired to visually inspect the size and conformation of the tubing T during a period shortly after the die forming operation for routine monitoring or diagnostic purposes.

Since it is commonly recognized to be advantageous to extrude tubing at a smaller diameter and greater wall thickness than the final products, the tubing T may conveniently be expanded in diameter on the order of 100 to 150% and the wall thickness reduced approximately 50%, depending upon the compounding of elastomer E, the desired characteristics of the finished product and other factors, during traverse along the take-away conveyor 40. The expansion of tubing T may be conveniently accomplished by a fluid supply conduit, generally indicated by the numeral 45, projecting from the die forming mechanism 15 into the tubing T, as seen in FIG. 2. As shown, the fluid supply conduit 45 has a tube 46 extending into a through bore 47 in the core 31 which communicates with the through bore 23 in hub 20 of spider 16 into which tube 46 also extends to terminate on the wall thereof in communication with a duct 48 extending through the hub 20, a rib 17, and the rim 18 of spider 16.

The duct 48 of fluid supply conduit 45 is connected to a fluid input, generally indicated by the numeral 50. As shown, fluid input 50 has a connecting tube 51 extending from duct 48, through tubular housing 13, and to a source of pressurized fluid such as an air compressor 52 which may be suitably regulated. Since the tubing T normally has a tendency to self-adherence when partially collapsed or deformed, the fluid input supply may include a non-adhesive material, such as soapstone or talc, which may be conveniently introduced to connecting tube 51 through a supply line 53 having a control valve 54 and leading to a remote supply hopper 55 of the non-adhesive material.

The controlled quantity of pressurizing fluid and non-adhesive material introduced to the fluid supply conduit 45 is directed into contact with the tubing T by means of a nozzle assembly, generally indicated by the numeral 60. As shown, the nozzle assembly 60 has a tubular cap 61 overlyingly attached to tube 41 and having one or more apertures 62 at its extremity which preferably may be angled toward the interior wall of tubing T to direct the non-adhesive material into contact therewith substantially proximate its point of discharge while under substantial directivity influence of the pressurized fluid.

In addition to the controlled ingress of pressurized fluid to the tubing T, it is necessary for the controlled expansion or growth of tubing T that provision be made for egress of the pressurizing fluid. This result is partially accomplished by providing a vent path, generally indicated by the numeral 65, which may conveniently be formed as an annular channel 66 around tube 46 which may be of lesser outside diameter than the through bore 47 in core 31. Since annular channel 66 communicates with through bore 23 of spider 16, the provision of one or more ports 67 through hub 20, a rib 17 and the rim 18 of spider 16 provides access externally of die forming mechanism 15 and tubular housing 13. If desired, a hose 68 may be connected to port 67 to direct the egress of fluid and, additionally, the fluid may be passed through a filter 69 if it is desired to extract particles of the non-abrasive material which may be entrained before discharge into the atmosphere. The egress path for pressurizing fluid according to the preferred operation through vent path 65 is more restricted than the ingress through fluid supply conduit 45 to avoid interference with the expansion of tubing T and the internal non-adhesive coating thereof and for additional reasons which become apparent hereinafter. This result may be accomplished by employing a port 67 of lesser cross-sectional area than duct 48, as shown, or other similar provision.

Subsequent to the travel of the tubing T along takeaway conveyor 40 and the attendant expansion or growth, the tubing T is passed into a curing unit, generally indicated by the numeral 70. The curing unit 70 to carry out the desired continuous processing may advantageously employ a fluid curing medium, as for example, a salt bath or other curing liquid L of the requisite heat conductivity characteristics, which is confined in a container C heated by a suitable heat source (not shown) of one of the types well known to persons skilled in the art. As best seen in FIG. 3, the tubing T, as it is discharged from take-away conveyor 40 and particularly roll 43 thereof, is deflected for immersion in the curing liquid L of the curing unit 70. This may be accomplished by employing an endless conveyor belt 71 mounted on rolls 72 and 73 so that the lower reach 71' of belt 71 (see FIG. 3) is at or slightly below the surface of curing liquid L to insure immersion of the entire periphery of tubing T in curing liquid L. Another roll or rolls such as hold down roll 74 may be employed to assist in directing the travel of tubing T, the roll 74 being mounted on a vertically adjustable screw member 75 for selectively positioning relative to the fixed roll 72.

In a manner similar to take-away conveyor 40, the endless conveyor belt 71 may be driven by a conventional power source (not shown) at a rate substantially equal to or slightly greater than the rate of advance of tubing T. The container C and belt 71 of curing unit 70 are of sufficient length so that based upon the temperature of curing liquid L and other factors the tubing T upon reaching roll 73 (FIG. 1) attains an optimum state of cure. As seen in FIG. 1, a guide roll 80 may be operatively positioned relative to roll 73 so that the cured tubing T threaded therearound is directed out of curing liquid L and passed into a constricting device generally indicated by the numeral 85. The constricting device 85 may consist of a pair of rolls 86 and 87 selectively relatively positioned, as by the adjustment screw 88, in order that the tubing T is constricted or collapsed to such an extent that the tubing T in curing liquid L is maintained uniformly expanded to its cured state size while allowing for venting of some pressurizing fluid through the second or open extremity T" of the cured tubing T extending outwardly of the rolls 86, 87 beyond curing unit 70. The relative positioning of rolls 86, 87, with pressurizing fluid venting through the first and second extremities T' and T", thus permits adjustment minimizing the possibility of undesired additional expansion or growth of tubing T during curing and stabilizing the tubing T against its tendency to laterally move or walk out from under conveyor belt 71 due to inherent buoyancy and the content of pressurizing fluid therein.

Thus, it should be evident that apparatus and a method employing the apparatus according to the concepts of the present invention have been shown and described in sufficient detail to enable one skilled in the art to practice the invention. Since various modifications in detail, material, arrangements of parts and processing steps and sequences are within the spirit of the invention herein disclosed and described, the scope of the invention should be limited solely by the scope of the attached claims.

We claim:

1. A method for forming and curing elastic material into continuous uniform thinwalled tubing comprising the steps of, die forming a mass of the elastic material into a thinwalled tubing, supplying a pressurizing fluid and a non-adhesive material interiorly of the tubing, passing the tubing through a fluid curing medium, subsequently selectively and partially constricting a portion of the tubing maintaining the tubing in a uniformly inflated condition while passing the tubing through said curing medium by venting a portion of said pressurized fluid through the partially constricted portion of the tubing, and simultaneously venting a portion of said pressurized fluid through the tube at the die forming location, so that at whatever location cure takes place in said curing medium said cured tube will be of uniform configuration [venting a portion of the pressurizing fluid through an extremity of the tube located in the die forming mechanism, and simultaneously venting the remaining portion of the pressurized fluid through an extremity of the tube located beyond said curing medium so that said tube is maintained in a uniformly inflated condition from said thinwalled tubing forming step through said curing step].

2. A method according to claim 1, including the step of expanding the tubing subsequent to the die forming and prior to passing it through the curing medium.

3. A method according to claim 2, wherein the tubing is deflected for immersion in the curing medium.

4. Apparatus for forming and curing elastic material into continuous uniform thinwalled tubing comprising, die forming means converting a mass of the elastic material ito a thinwalled tubing, core means in said die forming means communicating with the interior of the thinwalled tubing, conduit means in said core means supplying pressurizing fluid and non-adhesive material interiorly of the tubing, channel means in said core means for venting a portion of the pressurizing fluid within the tubing, constricting means selectively engaging the tubing for maintaining the tubing in a uniformly inflated condition and for simultaneously venting a portion of the pressurizing fluid from the tubing, and fluid curing means interposed between said die forming means and said constricting means.

5. Apparatus according to claim 4, wherein said constricting means includes roll means relatively positionable to selectively control venting of pressurizing fluid from the tubing.

6. Apparatus according to claim 4, including conveyor means interposed between said die forming means and said curing means supporting and displacing the tubing during expansion thereof by the pressurizing fluid from said conduit means.

7. Apparatus according to claim 4, wherein said curing means has a liquid curing medium into which the tubing is immersed.

8. Apparatus according to claim 7, wherein said curing unit has roll means controlling the travel of the tubing in said liquid curing medium.

9. Apparatus according to claim 4, wherein said die forming means has spider means through which said channel means and said vent means communicate exteriorly of said die forming means.

10. Apparatus according to claim 9, wherein said vent means is a channel having the conduit means disposed therein.

11. Apparatus according to claim 10, wherein said conduit means extends a distance outwardly of said core means into the tubing.

References Cited

UNITED STATES PATENTS

| | | | |
|---|---|---|---|
| 2,717,424 | 9/1955 | Francis et al. | 264—95 |
| 2,634,459 | 4/1953 | Irons | 264—95 |
| 1,196,648 | 8/1916 | Bleecker | 18—14 H |
| 2,620,515 | 12/1952 | Olson | 18—14 H |
| 2,401,774 | 6/1946 | Reichel | 264—298 |
| 3,560,602 | 2/1971 | Marzolf et al. | 264—173 |
| 2,781,550 | 2/1957 | Spencer | 264—347 |
| 1,949,465 | 3/1934 | Gammeter | 264—159 |
| 1,730,638 | 10/1929 | Young | 18—14 H |

ROBERT F. WHITE, Primary Examiner

J. R. THURLOW, Assistant Examiner

U.S. Cl. X.R.

264—89, 95, 178 R, 209, 236; 425—71, 378

UNITED STATES PATENT OFFICE
CERTIFICATE OF CORRECTION

Patent No. 3,787,552      Dated January 22, 1974

Inventor(s) Richard R. Spencer and William C. Penny

It is certified that error appears in the above-identified patent and that said Letters Patent are hereby corrected as shown below:

Column 2, line 12, "inhereently" should read --inherently--.
Column 6, line 39, insert a period (.) after "configuration"; line 40, cancel beginning with "[venting a portion" to and including "said curing step]." in line 46.

Signed and sealed this 10th day of September 1974.

(SEAL)
Attest:

McCOY M. GIBSON, JR.
Attesting Officer

C. MARSHALL DANN
Commissioner of Patents